United States Patent

[11] 3,565,247

| [72] | Inventor | Wilfred R. Brochman<br>Oakdale, Minn. |
|---|---|---|
| [21] | Appl. No. | 769,188 |
| [22] | Filed | Oct. 21, 1968 |
| [45] | Patented | Feb. 23, 1971 |
| [73] | Assignee | Minnesota Mining and Manufacturing Company<br>St. Paul, Minn. |

[54] PRESSURE-SENSITIVE ADHESIVE TAPE PRODUCT
12 Claims, 3 Drawing Figs.

[52] U.S. Cl. .................................................. 206/59,
161/119, 161/120, 161/144; 117/122; 260/2.5
[51] Int. Cl. ........................................................ B65d 65/00
[50] Field of Search .......................................... 206/59;
161/144, 119, 120; 260/2.5; 117/122 (A), 122
(P), 122 (PA)

[56] References Cited
UNITED STATES PATENTS

| 2,750,030 | 6/1956 | Tierney .................... | 161/144 |
| 2,864,882 | 12/1958 | Snell........................ | 117/122P |
| 3,072,584 | 1/1963 | Karpovich................. | 260/2.5 |
| 3,211,677 | 10/1965 | Feild et al. ................ | 260/2.5 |
| 3,230,184 | 1/1966 | Alford...................... | 260/2.5 |
| 3,249,458 | 5/1966 | Cornell et al. ............ | 117/122P |
| 3,331,729 | 7/1967 | Danielson et al. ........ | 161/162 |

Primary Examiner—Morris Sussman
Attorney—Kinney, Alexander, Sell, Steldt and Delahunt ABSTRACT: A pressure-sensitive adhesive tape product, in which a multiplicity of microscopic closed cells are distributed throughout the adhesive layer, displays high conformability, excellent shock resistance, and high "wet grab." Inclusion of blowing, nucleating and reinforcing agents facilitates the controlled formation of cells and improves handling qualities. If desired, the pressure-sensitive adhesive can be foamed after application of the tape to a substrate.

PATENTED FEB23 1971 3,565,247

INVENTOR.
WILFRED R. BROCHMAN
BY Kinney, Alexander,
Sell, Steldt & DeLaHunt
ATTORNEYS

PRESSURE-SENSITIVE ADHESIVE TAPE PRODUCT

BACKGROUND OF THE INVENTION

This invention relates to normally tacky and pressure-sensitive adhesive tape, to the manufacture of such tape, and to laminates made therewith.

Conventional pressure-sensitive adhesive tape products comprise a backing bearing a uniform layer of a pressure-sensitive adhesive, typically 5 mils thick or less. Although such products adhere well to most smooth surfaces, they often fail when applied to rough or irregular surfaces, e.g., bricks, sand finish plaster, unplaned wood, etc. Even where the backing is flexible, it is difficult—if not impossible—to secure such intimate contact with rough surfaces that the full effectiveness of the adhesive is realized. This problem becomes especially acute when it is desired to unite two nonparallel surfaces, particularly when the surfaces themselves are not smooth.

In many instances, the problem just mentioned can be solved by employing as the backing a compressible elastomeric foam, which deforms around the asperities on a surface to permit the pressure-sensitive adhesive to establish uniform contact. Although such products have attained remarkable commercial acceptance, their manufacture requires careful control and their use is limited to applications where a foam backing is acceptable.

Another way to achieve conformability of a pressure-sensitive adhesive tape to an irregular surface is simply to apply a thicker layer of adhesive, e.g., 15 mils instead of the customary 5 mils or less. Although the soft adhesive does deform when applied to rough surfaces, considerable pressure is required to attain uniform contact. Additionally, tape having such thicker adhesive layers is hard to manufacture, the adhesive tending to skin over and the escaping solvent causing irregular bubbling. Such products are decidely limited in application. Adhesive is, by and large, considerably more costly than backing, further militating against this approach.

It has long been recognized that the apparent volume of many conventional adhesive compositions could be increased by foaming or frothing them during cure. Thus, for example, Swiss Pat. No. 260,085 discloses foamed phenolic resins, and German Pat. No. 1,106,651 describes the foaming of alkyd, urea-formaldehyde and melamine-formaldehyde resins, using metallic soaps and finely divided inorganic materials as foam stabilizers.

Recognizing the advantages to be obtained with foamed adhesives, those skilled in the pressure-sensitive tape art have tried for decades to achieve a satisfactory tape product in which the pressure-sensitive adhesive layer was foamed. Attempts to create such a foamed layer have involved such expedients as whipping air into the adhesive, using highly volatile solvents which form bubbles during the drying of the adhesive layer, incorporating blowing agents such as ammonium carbonate, etc. Illustrative products of this type are disclosed in German Pat. No. 1,200,989. These products have invariably suffered from defects which made them unsuited for the purpose intended. The foaming action was hard to control, typically resulting in large, irregularly shaped bubbles, many of which collapsed and became ineffective or broke to leave craters in the surface. Blistering often occurred, making the resultant product unattractive and ineffective to accomplish the desired objective. Even where the appearance of the product was relatively satisfactory, prior art tape products having foamed adhesive layers have been unable to resist normal winding, handling, and storage procedures, the bubbles either wholly or partly collapsing before the product could be used.

SUMMARY

The present invention provides—for the first time, it is believed—a commercially acceptable highly conformable smooth-surfaced pressure-sensitive adhesive tape product in which the adhesive layer is 5—30 mils (preferably 10—15 mils) thick and contains a multiplicity of uniformly distributed closed microcells. Tape made in accordance with the invention can be repeatedly wound into and unwound from roll form, and the rolls of tape can be stored on edge for months and even dropped on edge from a height of several feet without permanently compressing the adhesive layers. The adhesive layer typically, however, shows less than 5 percent recovery after being compressed to half its original thickness. When applied to even a highly irregular surface, tape products made in accordance with this invention readily conform thereto, certain of the microcells in the foamed adhesive layer collapsing under the local high pressure imparted by protrusions while the others remain fully expanded.

When applied to a strong backing, e.g., a filament tape backing in which lineally aligned strong polymeric or glass fibers extend lengthwise of the tape, products made in accordance with this invention display an unusual and unexpected ability to absorb the shock of sudden loading without breakage. Tape products of the invention display high adhesion to surfaces, even when removed with sudden sharp "-zipping" motions, which typically cause erratic and damaging loss of adhesion when conventional tapes are similarly tested. The shock-resistant nature of such products also offers advantages in joining the end of one roll of sheet material to the beginning of another without stopping the machinery on which the sheet material is being processed.

In another aspect of this invention, both surfaces of a sheet backing are provided with a microcellular adhesive layer of the type just described, thereby providing a product having remarkable utility for holding together two nonparallel surfaces, as in attaching a manufacturer's emblem to a convex surface. Likewise the backing may comprise a temporary carrier for the microcellular adhesive layer, thereby providing a transfer tape which can be applied to a desired surface, the backing then being removed to expose a second adhesive surface, to which another substrate may be affixed.

The invention also contemplates the manufacture of tape structures in which the pressure-sensitive adhesive tape layer is not initially microcellular, but is capable of being converted to that state when desired. When an adhesive layer of this type is incorporated in the transfer tape structure of the type previously described, it possesses unusual utility in such application as providing a firm seal between sheets which are to be overlapped and riveted. The pressure-sensitive adhesive layer is placed between the portions of the two sheets which are to be riveted, serving as a temporary means of holding them in position. After riveting has been completed, the adhesive is rendered microcellular, thereby insuring intimate contact with all irregularities in the surface of each sheet and preventing the inadvertent passage of liquid or gas through the joint. This technique is particularly useful in the fabrication of aircraft skins from individual aluminum panels, enabling the manufacturer to insure that pressure will be maintained in the cabins of planes traveling at high altitudes.

The microcellular adhesive layer is prepared by uniformly incorporating throughout a conventional solution of pressure-sensitive adhesive a minor amount (usually less than 15 percent by weight) of a blowing agent and an extremely finely divided nucleating-reinforcing agent (on the order of 1—10 percent by weight). The solution is then heated to a temperature high enough to evaporate the solvent but not high enough to decompose the blowing agent. After the solvent has been evaporated, the temperature is increased to that necessary to decompose the blowing agent. The gas released during this decomposition forms minute (30—300 microns and typically 70—80 microns) generally spheroidal bubbles throughout the adhesive mass, apparently aided by the presence of the aforementioned nucleating agent. This agent also serves the desirable purpose of reinforcing the walls of the bubbles against unintentional collapse during normal handling; fumed silica particles which have an average particle size of considerably less than 1 micron and which tend to form hydrogen-bonded chains and "chicken-wire" type structures, are outstanding nucleating-reinforcing agents.

The manufacture of tape structures and pressure-sensitive adhesive layers which include microscopic closed cells, as described above, is accomplished simply and easily, provided that certain basic parameters are observed. For example, although suitable blowing agents can be either liquid or solid materials, the latter are preferred, since their volatility is somewhat lower and they do not tend to release gas prematurely. As little as 1 percent, based on the weight of the adhesive layer, is adequate to insure the production of numerous microbubbles, but it has been found that somewhat higher percentages insure adhesive layers containing a higher percentage of voids, although the average bubble diameter is still in the 30—300 micron range. If more than 15 percent blowing agent is employed, channeling tends to occur and the bubbles unite, reducing uniformity, causing the formation of excessively large cells within the adhesive layer and greatly diminishing the product's ability to withstand normal handling. All factors considered, it has been found that 4—10 percent blowing agent by weight is extremely effective in producing microbubbles of the desired size and distribution.

Several criteria should be considered in selecting a chemical blowing agent for the preparation of microcellular pressure-sensitive adhesives. For example, the blowing agent should decompose and release gas over a predictable range and at a controllable but reasonably rapid rate. Both the blowing agent and the gas evolved during decomposition should be physically and chemically compatible with the adhesive system to avoid destroying its effectiveness, and the gas should be neither toxic nor unpleasant smelling. Perhaps the most important consideration is that a blowing agent should be chosen which will decompose within the temperature range where the pressure-sensitive adhesive softens and becomes sufficiently fluid to be foamable.

One blowing agent which meets all the criteria specified in the preceding paragraph is N,N'-dimethyl-N,N'-dinitrosoterephthalamide; this compound has proved effective with a wide range of normally tacky and pressure-sensitive adhesives. Other blowing agents which may be used in many cases include diazoaminobenzene, benzenesulfonyl-hydrazide and toluene-(4)-sulfonyl hydrazide.

The inclusion of particulate nucleating-reinforcing agents within the adhesive layer greatly facilitates the formation of uniform microscopic bubbles within the adhesive during the blowing operation. As the amount of such nucleating agents increases from 1 to 10 percent, the size of the microscopic bubbles remains essentially constant, but their number increases. The inclusion of excessive amounts of nucleating-reinforcing agent tends to detract from the effective tackiness of the adhesive, and, all factors considered, it has been found that approximately 5 percent by weight is particularly effective.

BRIEF DESCRIPTION OF THE DRAWING

Understanding of the invention will be facilitated by referring to the accompanying drawing, in which like numbers refer to like parts in several views, and in which.

DESCRIPTION OF PRESENTLY PREFERRED EMBODIMENTS

Figure 1:
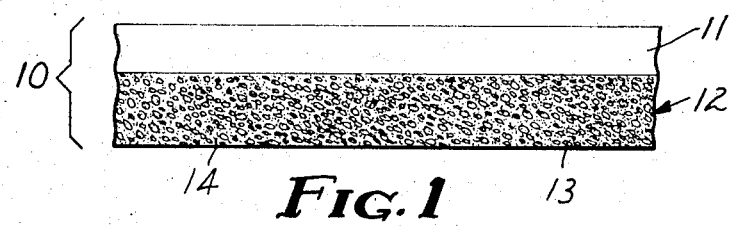
FIG. 1 is an edge view of a normally tacky and pressure-sensitive sheet product 10 made in accordance with the invention, comprising backing 11 and microcellular adhesive layer 12.
Figure 2:
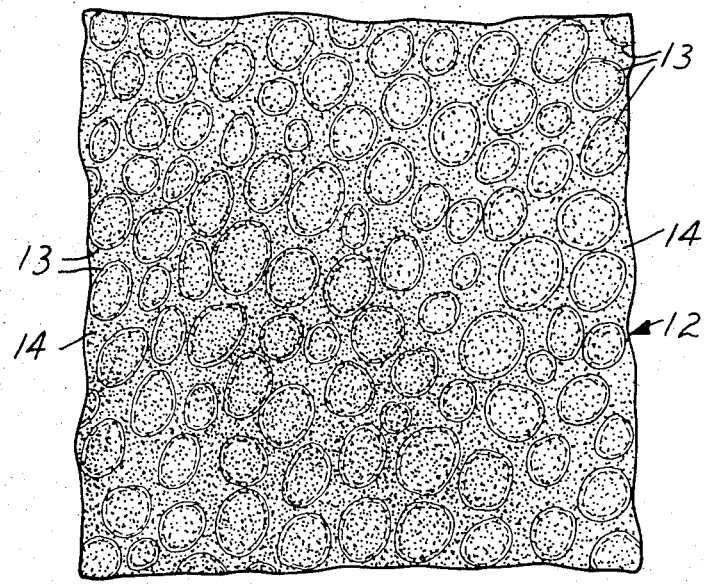
FIG. 2 is an enlarged view of the face of pressure-sensitive adhesive layer 12 in FIG. 1, showing adhesive 13 containing microcells 14.

Without in any way attempting to limit the invention, the following examples are set forth to illustrate the nature of the invention and to suggest some of its unique advantages.

EXAMPLE 1

A 20 percent solution of 95.5:4.5 isoctyl acrylate:acrylic acid polymer of the type described in example 5 of Ulrich Reissue Pat. 24,906 was prepared in 4:1 heptane: isopropyl alcohol. One hundred parts of the polymer solution was weighed into a container and agitated while 7.5 parts of finely divided N,N'-dimethyl-N,N'-dinitrosoterephthalamide blowing agent was added. Agitation was continued for 10 minutes, after which the mixture was homogenized to obtain a uniform dispersement of the blowing agent. The homogenized mixture was then added slowly, with stirring, to an additional 400 parts of the polymer solution. Stirring was continued for 30 minutes while 6.3 parts of fumed silica having an average particle size of 0.012 micron (commercially available from Cabot Corporation under the Registered Trademark "Cab-0-Sil" M-5)* was added in three approximately equal increments to yield a foamable adhesive solution.

A uniform layer of the foamable adhesive solution was coated on one side of a kraft paper liner having a silicone release coating on both sides and the solvent evaporated in an oven at about 70° C., leaving about 19 grains of adhesive per 24 square inches. A 3-mil synthetic paperlike reinforcing sheet, having a basis weight of about 9 lbs. per papermaker's ream and formed from a nonwoven web of 178-denier rayon fibers bonded with polyvinyl alcohol, was then laminated to the dried adhesive surface. A uniform coating of the foamable adhesive solution was then applied to the reverse side of the silicone-treated kraft paper and the solvent evaporated in 70° C. oven, so as to leave about 19 grains of adhesive per 24 square inches. When the liner, having a layer adhered to each side, was wound into roll form, the second adhesive coating became permanently attached to the exposed surface of the rayon/polyvinylalcohol paper, forming an adhesive-paper-adhesive laminate about 7 mils thick. When the roll containing this laminate and the liner was unwound, the laminate completely transferred to one side of the liner.

The adhesive-paper-adhesive laminate, carried by the liner, was subjected to 150° C. for approximately one minute by passing it, adhesive side out, over a hot can having a 3-foot diameter, the blowing agent decomposing and releasing nitrogen gas which caused the formation of a microcellular structure in the adhesive coat. The original 7-mil laminate expanded to a thickness of 18 mils, \* A chemically and functionally equivalent product having a diameter of about 0.02 micron is obtained from Degussa Inc. under the trade designation "Aerosil" R-972, yielding a transfer tape which could be wound into roll form by normal tape handling procedure and stored for approximately a year without losing more than 3 mils in caliper. The diameter of the generally spheroidal microcells was on the order of 200—300 microns.

The tape of this example displayed remarkable ability to conform to rough or irregular surfaces against which it was pressed, an attribute not possessed by a conventional unblown film made from the same weight of the same adhesive. The conformability of tape can be measured by a modification of the 180° peel adhesion test described in Test Methods for Pressure-Sensitive Tapes, 5th Edition, Pressure-Sensitive Tape Council, 1201 Waukegan Road, Glenview, Illinois 60025. The tape of this example was provided with a backing by laminating it to one face of a sheet of 1.6-mil cellophane. The exposed adhesive surface was then adhered to the face of a sheet of Grade 220 coated abrasive which had been attached, abrasive side up to a rigid support. The cellphane-backed tape was then doubled back on itself at 180° and the force to strip the tape away from the sandpaper was measured at a speed of 12 inches per minute. The average value for the microcellular tape of this example was 14 ounces per inch of width, while an identical tape, having the same adhesive coating weight but not being cellular, required a force of only 3 oz. per inch of width.

Tapes of this type are useful for low-load mounting applications, e.g., nameplates, light wood trim, posters, etc. Such tapes have also proved useful for making flying splices in the paper industry.

EXAMPLE 2

An adhesive and double-coated synthetic paper-reinforced tape were prepared using the same adhesive and the same coating and drying procedures as in example 1, the total weight of dried adhesive being 34 grains per 24 square inches. The adhesive was heated to yield a microcellular structure by passing the liner bearing the tape, adhesive side up, 3 inches below a 1500 watt tubular infrared heat lamp having a gold-plated parabolic reflector, at a rate of 40 inches per minute. The original 5—6 mil adhesive thickness expanded to 11—13 mils, the diameter of the microcells being about the same as in example 1.

The tape of this example was subjected to a tack rolling ball test as described in the aforementioned Pressure-Sensitive Tape Council publication. This test measures the distance a small steel ball rolls down an inclined plane surfaced with the tape product being evaluated; the greater the tackiness of the adhesive, the shorter the distance which the ball travels. The superior conformability of tapes made in accordance with this invention causes an increase in the area of adhesive contacting the ball and thus indicates a greater apparent tackiness than a conventional tape having an identical but unfoamed adhesive. For both a 5-gram ball and a 35-gram ball, the distance of travel on the tape of this example was approximately two-thirds that on a tape having an unfoamed adhesive of the same composition.

EXAMPLE 3

One side of a 2-mil biaxially oriented polyethylene terephthalate film was provided with an ultra-thin low adhesion silicone backsize coating. To the opposite side was then applied a uniform coat of the adhesive solution described in example 1, the solvent was then evaporated to leave a 3-mil adhesive layer weighing about 15.7 grains per 24 square inches. This tape was subjected to 280° F. for approximately 1 minute by passing it, adhesive side out over a 3-foot diameter hot can, the original 3-mil adhesive layer expanding to 8 mils and the microcells being about the same size as in example 1.

This tape displayed superior adhesion to rough surfaces when subjected to the modified 180° peel adhesion test described in example 1. The average value obtained was 8 oz. per inch of width, while a noncellular product of identical composition and coating weight had an adhesion of only 1.5 oz. per inch of width. It is noted that both values are about half those obtained with the tape of example 1, largely because only about half as much adhesive was present.

EXAMPLE 4

A 90:10 isooctyl acrylate:acrylic acid copolymer was prepared as in example 3 of Abere and Brochman U.S. Pat. No. 3,389,827, yielding a product having an inherent viscosity of about 1.8 as measured in dilute ethyl acetate solution using a size 50 Cannon-Fenske viscosimeter. The polymer solution was then diluted with heptane to a total solid content of 20 percent nonvolatiles. An adhesive was prepared by placing 100 parts of the polymer solution in a container and agitating it while 12 parts of finely divided N,N'-dimethyl-N,N'-dinitrosoterephthalamide blowing agent was added. Mixing was continued for 10 minutes, after which the mixture was homogenized to obtain uniform dispersion of the blowing agent. This homogenized mixture was then added slowly with stirring to an additional 400 parts of the polymer solution. Stirring was continued for 30 minutes while 2 parts of "Cab-0-Sil" M-5 was added, to yield a foamable adhesive solution.

A tape was prepared as follows: 0.072 gram of a polyalkyleneimine crosslinking agent was added to the foamable adhesive solution, which was then coated on a release liner, the solvent evaporated and the adhesive heated to cause foaming, all as described in example 1. The total amount of dried adhesive was 34 grains per 24 square inches, having a thickness of 6 mils before, and 9—10 mils after, foaming; the diameter of the generally spheroidal microcells was on the order of 60—90 microns. The adhesive used in this example is somewhat tougher than that of example 1, apparently accounting for the somewhat smaller cell size.

Tapes of this type are useful for high-load hyper-shear mounting applications. A test measuring effectiveness for this purpose is described as follows:

A rectangular aluminum plate (4 inches by 8 inches) (10 cm. by 20 cm.) is used, having a polished flat shiny-smooth face surface to provide a standard test surface free from complications that would result from using a rough or uneven surface. A straight bottom edge (having the longer dimension) is milled to form an angle of 90° to the face of the plate.

A weighted aluminum testing block simulating a mounted article is also used, made of a 1 inch by 1 inch (2.54 cm. by 2.54 cm.) square block which is ½inch (1.27 cm.) thick, the edges being milled to be at an angle of 90° to the face which is a polished shiny-smooth flat surface. A small hook (for supporting the weight) is secured to the bottom edge, equidistant from the sides, but offcentered by ⅛ inch (3.2 mm.) so as to be nearer the face side than the back side of the block. The face surfaces of the plate and block are cleaned just before use by first polishing with a fine abrasive cloth to remove surface imperfections, followed by washing with methyl ethyl ketone solvent and drying.

The liner-protected adhesive tape is conditioned before testing by exposure to the atmosphere at approximately 22° C. and 50 percent relative humidity for at least 16 hours, and the test is performed under these conditions.

A tape sample larger than the block is used. Carrying a liner on one side, the exposed tacky side is contacted with the face of the test block, the sample being applied with a rolling motion to insure intimate contact and prevent air entrapment. The sample is then trimmed with a razor blade to the precise size of the block. The liner is removed and the test block is positioned, using a rolling motion, upon the face of the plate (now supported in horizontal position upon a table) so that the hook-carrying bottom edge is in alignment with the bottom edge of the plate. A 1000 gram weight is placed upon the horizontal back of the test block for 15 minutes to exert a controlled pressing action and to assure intimate contact between the two adhesive coatings and the aluminum surfaces. The plate is then mounted in a vertical position and a 2000 gram weight is hung from the hook at the bottom of the block. The square sample of foam-layer adhesive tape is thus suspended between and adhered to the plate and the block, the latter being loaded by the suspended weight and tending to drag the tape sample downward on and past the plate surface.

The time interval between the hanging of the weight and the dropping of the block, measured in hours, is the "bonding strength adhesion value" referred to herein. This value should be at least 30 hours, and preferably at least 50 hours.

It will be noted that under these test conditions the mounted tape sample carries a load (due both to the weight of the aluminum block and to the suspended weight) which is much greater per unit area of the tape than is involved in the actual mounting usages previously mentioned, and that the tape is in contact with smooth flat aluminum surfaces. An accelerated type of test is obviously necessary. Experience indicates that a mounting tape having a bonding strength adhesion value of at least 30 hours, as thus determined, should assure a durable mounting function under normal conditions of usage.

The block shear strength value of the tape of this example 4 (as determined by the foregoing test) was in excess of 166 hours; failure occurring by splitting (shearing) of the adhesive. A tape having an identical weight of the same, but unfoamed, adhesive failed after approximately 10 hours.

EXAMPLE 5

Five hundred parts of a 25 percent nonvolatile solution of tackified butadiene: styrene block copolymer adhesive was prepared generally in accordance with example 1 of Abere and Brochman U.S. Pat. No. 3,389,827 as follows: 100 parts of this solution was weighed into a container and agitated while 6.0 parts of N,N'-dimethyl-N,N'-dinitrosoterephthalamide blowing agent is added, mixing continued for 10 minutes, and the mixture then homogenized to obtain uniform dispersion of the finely divided blowing agent. This homogenized mixture was then added slowly with stirring to the additional 400 parts of solution and stirring continued for 30 minutes while 2.0 parts of "Cab-0-Sil" M-5 was added, yielding a foamable adhesive solution.

A tape was prepared and foamed in the same manner as described in example 1, with the exception that the total amount of dried adhesive was 32 grains per 24 square inches. The original 8-mil structure expanded to 12 mils upon foaming, largely because of the thermoplastic nature of the adhesive. Diameter of the microcells was on the order of 50—75 microns. Like the tape of example 4, the tape of this example 5 is also useful for high load mounting applications. As measured by the test described in example 4, it has a failure time in excess of 166 hours.

EXAMPLE 6

An adhesive was prepared as follows: 92.5 parts of commercial grade methyl ethyl ketone and 92.5 parts of commercial grade toluene were weighed into a container and agitated while 85 parts of pulverized polyterpene resin (Hercules S-1010) and 100 parts of a thermoplastic rubbery block copolymer of styrene: butadiene:styrene were added. Mixing was continued for 10 hours until a total solution, containing 50 percent nonvolatiles, was formed. To this solution was added 11.1 parts of the liquid blowing agent diisopropyl azodiformate 11.1 parts of catalyst ("Lucidol" DS-207), and 5.5 parts of "Cab-0-Sil" M-5. Stirring was continued until complete solution resulted.

Using the foamable adhesive solution just described, a tape was prepared as generally set forth in example 1, the dried adhesive layer was 5.5 mils thick and weighed 36 grains per 24 square inches. To obtain a microcellular structure, the tape was placed in a 120° C. steam-heated forced air oven for 1 minute. The caliper of the dried adhesive structure was about 15 mils, with the microcells having a diameter of about 150-—250 microns. This tape was useful for the same general applications as the product of example 5.

EXAMPLE 7

An adhesive was prepared as follows: 200 parts of commercial grade toluene was weighed into a container and agitated, while 100 parts of pulverized polyterpene resin (Hercules S-1,010) and 100 parts of another thermoplastic rubbery block copolymer of styrene:butadiene:styrene were added. Mixing was continued for 10 hours until a total solution, containing 50 percent nonvolatiles, was formed. From this solution 50 parts was weighed into a container and agitated while 11.0 parts of N,N'-dimethyl-N,N'-dinitrosoterephthalamide was added. Mixing was continued for 10 minutes, followed by homogenization. The homogenized mixture was then added slowly with stirring to the remaining 350 parts of solution and stirring was continued for 30 minutes while 10.0 parts of "Cab-0-Sil" M-5 was added.

A tape was prepared in the same manner as described in example 1, but was not foamed. The total amount of dried adhesive weighed 34 grains per 24 square inches and was about 7 mils thick.

Figure 3:
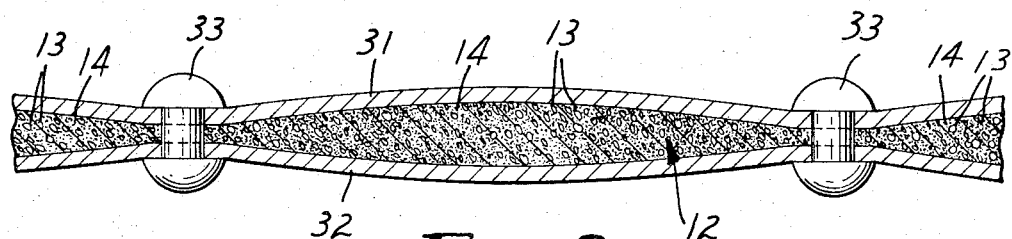
FIG. 3 is a view in cross section of a riveted joint in which an adhesive transfer tape made in accordance with this invention is used to provide a seal between faying surfaces.

If heated while unconfined, the adhesive expands to about 21 mils, with the microcells being about 125—175 microns in diameter; this tape is not, however, foamed prior to use. It can be interposed between panels which are then overlapped and riveted, the seam thereafter being subjected to a blast from a hot air gun to foam the adhesive and thereby form an airtight seal. FIG. 3 illustrates the appearance of the riveted seam in a diagrammatic cross-sectional view. Rivets 33 join panels 31 and 32, with foamed adhesive layer 12 (made up of adhesive 13 containing microbubbles 14) conforming to irregularities and filling all space between the panels.

EXAMPLE 8

An adhesive of the type described and claimed in Drew U.S. Pat. No. 2,410,053 is prepared as follows: a base formed by combining 100 parts of crude rubber, 20 parts of zinc oxide and 20 parts of titanium oxide on a rubber mill is put into a mogul, previously warmed up with 40 pounds steam pressure in the heating jacket. The base is worked for 20 minutes in the hot mogul, after which 20 parts of wood rosin is added and mixing continued until a uniform blend is obtained. Forty parts of polyterpene resin ("Piccolyte" S-115) is then added and mixing continued for approximately 2 hours and 25 minutes. The mogul is cooled and maintained at 230° F., 10 parts of B-stage soluble phenol-formaldehyde resin ("Bakelite" CKR 1634) resin added and mixing resumed for 15 minutes. The mogul is then cooled by passing cold water through the jacket, 10 parts of the same phenolic resin and 2 parts of 2,5-di-tertamyl hydroquinone ("Santovar" A) resin added and mixing continued for 3 minutes. Then 85 parts of heptane is added, mixed for 10 minutes, 5 parts of zinc resinate and 258 parts heptane added, and mixing continued until a uniform solution, containing approximately 37 percent nonvolatiles is obtained.

From this solution 70 parts is weighed into a container and stirred while 5 parts N,N'-dimethyl-N,N'-dinitrosoterephthalamide is added, stirring continued for 10 minutes, and the mixture homogenized to form a foamable masterbatch. This masterbatch is stirred into 200 parts of the adhesive solution and stirring continued for 30 minutes while adding 5.0 parts of "Cab-0-Sil" M-5. Tape is then prepared as described in example 1, the dried adhesive being 6 mils thick and weighing 31 grains per 24 square inches. The adhesive is foamed as in example 1, the resultant caliper being 11 mils and the diameter of the microcells being about 75—150 microns.

I claim:

1. In a convolutely wound roll of tape comprising a sheet backing having a layer of normally tacky and pressure-sensitive adhesive coated over one major surface thereof, the improvement which comprises:
    utilizing as said adhesive layer a normally tacky and pressure-sensitive adhesive having distributed throughout a multiplicity of autogenous microscopic spheroidal closed cells, on the order of 30—300 microns in effective diameter, said cells being present in said adhesive layer in amount such that the void volume of said adhesive layer is on the order of 25—85 percent, the walls of said cells being defined by said adhesive;
    whereby said roll of tape can be stored on edge for long periods of time without significant permanent deformation, said adhesive layer being readily and permanently compressible so as to conform to irregular surfaces.

2. The invention of claim 1 wherein the adhesive layer contains up to 15 percent by weight of a nucleating-reinforcing agent formed of particles having an average diameter of well below 1 micron.

3. The invention of claim 2 wherein the nucleating agent is fumed silica.

4. The invention of claim 2 wherein the backing functions as a temporary carrier, being removable from the adhesive layer after the exposed surface thereof has been applied to a substrate, thereby providing a highly conformable transfer adhesive.

5. The invention of claim 2 wherein each major surface of said backing is provided with similar adhesive layers, each being firmly adherently bonded to said backing.

6. In the manufacture of adhesive sheet material wherein a layer of normally tacky and pressure-sensitive adhesive is applied to a sheet backing, the improvement which comprises:
    including in said adhesive, uniformly distributed throughout, from 2 to 15 percent by weight of a blowing agent which decomposes to yield gas when subjected to heat and from 1 to 10 percent by weight of a finely divided nucleating-reinforcing agent around which bubbles of said gas can form;

whereby said adhesive layer can be heated to increase its thickness by at least one-third by the formation of microscopic closed cells, thereby enabling the surface of said adhesive layer to conform to irregular surfaces.

7. The invention of claim 6 wherein the blowing agent is N,N'-dimethyl-N,N'-dinitrosoterephthalamide.

8. The invention of claim 7 wherein the nucleating-reinforcing agent is fumed silica.

9. A joint comprising in combination two juxtaposed incompletely parallel surfaces which have disposed therebetween, uniformly in contact therewith and firmly united said surfaces, an adhesive layer comprising a normally tacky and pressure-sensitive adhesive throughout which are distributed a multiplicity of spheroidal cells having an average diameter on the order of 30 to 300 microns and being present in an amount such as to constitute at least 25 percent of the volume of said layer, the walls of said cells being defined by said adhesive.

10. The joint of claim 9 wherein a sheet backing member is centrally disposed within the adhesive layer and firmly adherently bonded thereto.

11. A roll of tape formed from an elongate strip of normally tacky and pressure-sensitive adhesive sheet material wound convolutely upon itself about an annular core and readily unwindable therefrom, said roll being storable for several months on edge without substantial permanent deformation, said strip comprising in combination:

a sheet backing having firmly adherently bonded to one major surface thereof a layer of normally tacky and pressure-sensitive adhesive, said adhesive layer;

being smooth-surfaced and having substantially uniformly distributed throughout, so as to constitute from 40 to 70 percent of the volume of said layer, a multiplicity of autogenous spheroidal closed cells having an average diameter on the order of 60 to 120 microns, the walls of said cells being defined by said adhesive;

having distributed throughout from 1 to 10 percent by weight of fumed silica particles, and being further characterized by compressibility and less than about 5 percent recovery in thickness when compressed to half its original thickness;

whereby said tape displays excellent adhesion to even irregular substrates to which it is applied under very light pressure, outstanding adhesion when removed from substrates at high speeds, and superior impact resistance.

12. The tape of claim 11 wherein the backing comprises strong lineally aligned filaments.

UNITED STATES PATENT OFFICE
CERTIFICATE OF CORRECTION

Patent No. 3,565,247     Dated  Feb. 23, 1971

Inventor(s)   Wilfred R. Brochman

It is certified that error appears in the above-identified patent and that said Letters Patent are hereby corrected as shown below:

In Column 1, line 36 "decidely" should be -- decidedly

In Column 4, line 23, "paperlike" should be-paper-like line 25, "178-denier" should be -- 1-1/2-denier --; line 46, "*A...R-972" should be at the bottom of the page; line 48, "yielding...microns" should be in regular print and should continue on after "18 mils," (line 45).

Signed and sealed this 20th day of February 1973.

(SEAL)
Attest:

EDWARD M. FLETCHER, JR.
Attesting Officer

ROBERT GOTTSCHALK
Commissioner of Pat